Patented July 27, 1943

2,325,153

UNITED STATES PATENT OFFICE 2,325,153

PRODUCTION OF TEXTILE MATERIALS

Richard R. Sitzler, Cumberland, Md., assignor to Celanese Corporation of America, a corporation of Delaware No Drawing. Application June 10, 1939, Serial No. 278,479

5 Claims. (Cl. 106—176)

This invention relates to the production of textile and other materials from solutions containing acetone-soluble cellulose esters, and relates more particularly to the production of cellulose ester solutions of lower viscosity.

An important object of this invention is the provision of improved solutions of acetone-soluble cellulose esters for use in the manufacture of artificial textile and other materials.

Another object of this invention is to produce solutions of acetone-soluble cellulose acetate in a novel solvent mixture for use in the manufacture of filaments, yarns, etc. by dry spinning processes characterized by being of lower viscosity than solutions of cellulose acetate in acetone.

A further object of this invention is to produce artificial filaments, yarns and the like of improved properties.

Other objects of this invention will appear from the following detailed description and claims.

In the manufacture of filaments, yarns, films, foils, etc. from cellulose esters, the cellulose ester is dissolved in a suitable solvent to form a solution of the desired concentration. In all cases the solution thus formed is more or less viscous. For ease of handling such solutions it is desirable that for a given concentration, they should have minimum viscosity. While this invention is applicable to any acetone-soluble cellulose ester such as cellulose acetate, cellulose propionate and cellulose butyrate, it will be described in connection with acetone-soluble cellulose acetate which at the present time is commercially the most important of the cellulose esters.

I have discovered that improved results may be obtained in the preparation of cellulose acetate spinning solutions by employing a solvent mixture containing dimethylene oxide (ethylene oxide), trimethylene oxide (1,3-propylene oxide) or tetramethylene oxide (1,4-butylene oxide), that is, polymethylene oxides in which the oxide linkage is across the terminal carbons. The use of such polymethylene oxides in the solvent mixture comprising acetone results in a solution of lower viscosity as compared with a solution of cellulose acetate in acetone alone. Because of reduction in viscosity of the cellulose acetate solution, the solution may be filtered more readily and more economically and when extruded through fine orifices in the spinning of yarn does not tend to clog the same. Moreover, pipes of smaller diameter may be employed for conveying such solutions because of their reduced viscosity. Furthermore, by employing polymethylene oxides in the solvent mixture, more concentrated solutions of cellulose acetate may be made, which solutions would have the same viscosity as solutions containing smaller amounts of cellulose acetate where no polymethylene oxide is used.

Although, as stated, any polymethylene oxide may be employed in accordance with this invention, I prefer to use tetramethylene oxide and the invention will be described in connection therewith. While I have found that tetramethylene oxide itself is a good solvent for acetone-soluble cellulose acetate, it does not yield a solution of cellulose acetate of lower viscosity when employed alone, but it is necessary to use this compound in admixture with acetone to obtain the desired result, i. e. a solution of lower viscosity. Moreover, the proportion of tetramethylene oxide which may be employed for the preparation of the cellulose acetate solution of the desired viscosity characteristics is of the utmost importance. To obtain cellulose acetate solutions of reduced viscosity, the tetramethylene oxide is used in proportions of from 10 to 50% of the solvent mixture, and preferably from 25 to 50%.

The use of from 25 to 50% of tetramethylene oxide in the solvent mixture comprising acetone results in a solvent mixture which is a better solvent for cellulose acetate than is acetone alone. Thus, a solvent mixture comprising tetramethylene oxide and acetone is a better solvent for cellulose acetate than either tetramethylene oxide or acetone alone. Accordingly, the amount of water necessary to be employed in solvent mixture of tetramethylene oxide and acetone may be reduced, the reduction being 40% of that normally employed when acetone alone is used as the solvent.

The reduction in the water content of the cellulose acetate solution makes for a spinning solution which yields improved results when spun into yarn. Thus yarns spun from a solution prepared in accordance with this invention possess a better tenacity than yarns spun from solutions heretofore employed.

The tetramethylene oxide because of its boiling point of 67° C. possesses the added advantage that it is practically impossible to separate the same from acetone by ordinary methods of distillation. Consequently, the use of a solvent mixture of tetramethylene oxide and acetone would not complicate the problem of solvent recovery, which is an important factor in carrying out a spinning process economically.

An important application of my invention is the use of tetramethylene oxide as a constituent of a solvent mixture comprising acetone in the preparation of solutions, plastics, liquid coated compositions and the like containing acetone-soluble cellulose esters, or wherever solutions of cellulose esters of lower viscosity are desirable.

Plasticizers such as dibutyl tartrate, dimethyl phthalate, diethyl phthalate, triacetin and other plasticizers that may be employed with solutions of cellulose acetate in acetone may be employed in solutions of cellulose acetate in the solvent mixture of acetone and tetramethylene oxide.

In order further to illustrate my invention, but without being limited thereto the following specific example is given.

Example

A spinning solution is made by dissolving 26 parts by weight of cellulose acetate in 74 parts of a solvent mixture containing 72.75 parts of acetone, 24.25 parts of tetramethylene oxide and 3 parts of water. The solution thus formed has a lower viscosity than a solution prepared with a solvent medium containing 97 parts of acetone and 3 parts of water.

The above solution is extruded through orifices into a drying evaporative atmosphere. The filaments thus formed have a higher tenacity than that possessed by filaments made from spinning solutions heretofore employed.

It is to be understood that the foregoing detailed description is given merely by way of illustration and that many variations may be made therein without departing from the spirit of my invention.

Having described my invention, what I desire to secure by Letters Patent is:

1. A spinning solution of reduced viscosity for use in the manufacture of artificial filaments, threads, ribbons and like artificial materials comprising an acetone-soluble cellulose ester dissolved in a mixture of solvents therefor comprising acetone and a polymethylene monoxide in which the oxide linkage is across the terminal carbons, the amount of the polymethylene oxide present in the mixture being in a proportion of at most 50 parts by weight.

2. A spinning solution of reduced viscosity for use in the manufacture of artificial filaments, threads, ribbons and like artificial materials comprising an acetone-soluble cellulose ester dissolved in a mixture of solvents therefor comprising acetone and tetramethylene oxide, the amount of the polymethylene oxide present in the mixture being in a proportion of at most 50 parts by weight.

3. A spinning solution of reduced viscosity for use in the manufacture of artificial filaments, threads, ribbons and like artificial materials comprising acetone-soluble cellulose acetate dissolved in a mixture of solvents therefor comprising acetone and tetramethylene oxide, the amount of the polymethylene oxide present in the mixture being in a proportion of at most 50 parts by weight.

4. A spinning solution of reduced viscosity for use in the manufacture of artificial filaments, threads, ribbons and like artificial materials comprising acetone-soluble cellulose acetate dissolved in a solvent mixture containing tetramethylene oxide and acetone in a proportion of from 10 to 50 parts by weight of tetramethylene oxide to 90 to 50 parts by weight of acetone.

5. A spinning solution of reduced viscosity for use in the manufacture of artificial filaments, threads, ribbons and like artificial materials comprising acetone-soluble cellulose acetate dissolved in a solvent mixture consisting of tetramethylene oxide, acetone and water, the amount of the polymethylene oxide present in the mixture being in a proportion of at most 50 parts by weight.

RICHARD R. SITZLER.